United States Patent
Dolansky

(10) Patent No.: US 7,174,225 B2
(45) Date of Patent: Feb. 6, 2007

(54) METHOD AND SYSTEM FOR SIMULATING PROCESSING OF A WORKPIECE WITH A MACHINE TOOL

(75) Inventor: Stefan Dolansky, Altdorf (DE)

(73) Assignee: Siemens Aktiengesellschaft, München (DE)

( * ) Notice: Subject to any disclaimer, the term of this patent is extended or adjusted under 35 U.S.C. 154(b) by 266 days.

(21) Appl. No.: 10/984,197

(22) Filed: Nov. 9, 2004

(65) Prior Publication Data

US 2005/0102054 A1 May 12, 2005

(30) Foreign Application Priority Data

Nov. 12, 2003 (DE) ................. 103 52 815

(51) Int. Cl.
*G05B 11/01* (2006.01)
*G06G 7/48* (2006.01)
*G06F 9/445* (2006.01)

(52) U.S. Cl. ................. 700/26; 703/7; 703/20

(58) Field of Classification Search ............. 700/26, 700/28–31, 86–88, 95–97, 159, 173, 177, 700/178; 703/3, 6, 7, 20–22; 706/44, 920–923; 717/135; 324/383

See application file for complete search history.

(56) References Cited

U.S. PATENT DOCUMENTS

| | | | | |
|---|---|---|---|---|
| 6,662,073 B1 * | 12/2003 | Fujishima et al. | .......... | 700/173 |
| 6,856,853 B2 * | 2/2005 | Takahashi et al. | .......... | 700/178 |
| 6,941,176 B2 * | 9/2005 | Kamihira et al. | ............. | 700/28 |
| 7,027,963 B2 * | 4/2006 | Watanabe et al. | ............. | 703/1 |
| 2002/0133264 A1 * | 9/2002 | Maiteh et al. | .............. | 700/182 |
| 2002/0133329 A1 * | 9/2002 | Kano et al. | .............. | 703/22 |
| 2003/0033133 A1 * | 2/2003 | Kleyer | ............. | 703/22 |
| 2003/0078762 A1 * | 4/2003 | Hashima et al. | .............. | 703/13 |
| 2004/0210426 A1 * | 10/2004 | Wood | ............. | 703/2 |
| 2005/0071038 A1 * | 3/2005 | Strang | ............. | 700/121 |
| 2006/0085176 A1 * | 4/2006 | Bellantoni et al. | ............. | 703/14 |

FOREIGN PATENT DOCUMENTS

| | | |
|---|---|---|
| DE | 100 47 928 | 6/2001 |
| DE | 101 14 811 A1 | 10/2002 |
| DE | 102 26 198 A | 12/2002 |
| JP | 07-084620 A | 3/1995 |
| WO | WO 01/67193 A2 | 9/2001 |

OTHER PUBLICATIONS

CAD/CAM und CIM in der Metallbearbeitung (CAD/CAM and CIM in metal processing) by Stefan Peiker and Norbert Schrüfer, published in "tz für Metallbearbeitung", vol. 82, No. 6/88, 1988, pp. 17 to 27.

\* cited by examiner

*Primary Examiner*—Maria N. Von Buhr
(74) *Attorney, Agent, or Firm*—Henry M. Feiereisen

(57) ABSTRACT

An application program that describes processing of a workpiece by the machine tool in form of instruction steps is disclosed. A computer executes the application program and step-by-step determines based on a simulation program machine-dependent control commands for a controller. The machine-dependent control commands depend on a virtual time base that is independent of an actual time base. The computer determines based on a computer-internal model of the machine tool and the determined machine-dependent control commands expected actual states of the machine tool, thereby simulating execution of the machine-dependent control commands by the machine tool. The simulation program is implemented as control software in the controller.

17 Claims, 3 Drawing Sheets

METHOD AND SYSTEM FOR SIMULATING PROCESSING OF A WORKPIECE WITH A MACHINE TOOL

CROSS-REFERENCES TO RELATED APPLICATIONS

This application claims the priority of German Patent Application, Ser. No. 103 52 815.6, filed Nov. 12, 2003, pursuant to 35 U.S.C. 119(a)–(d), the disclosure of which is incorporated herein by reference.

BACKGROUND OF THE INVENTION

The present invention relates to a method and system for simulating processing a workpiece with a machine tool. The invention is also directed to a computer program and to a computer programmed with a computer program for carrying out the method.

Nothing in the following discussion of the state of the art is to be construed as an admission of prior art.

Machine tools are typically controlled by numeric controllers which execute an application program that has instruction steps, for example a part program according to DIN 66025. The application program determines the process flow in the machine, e.g., the travel paths of various tools.

The operating system of numeric controllers is typically a real-time operating system. Numeric controllers can also include control software to convert the instruction steps of the application program to machine-dependent control commands. The term real-time operating system indicates that this conversion takes place in real-time. The real-time operating system together with the control software forms the so-called real-time kernel. The numeric controller hence processes the application program within the real-time kernel.

As described above, the real-time kernel operates in real-time and coordinates, in particular, the movement of the machine axes as well as other travel of the machine tool in such a way that the process requested by the application program is carried out. The real-time kernel also determines the interpolation clock rate and the type of the interpolation. Accordingly, the kernel affects the actual machining process and the time required for the machining process.

For example, the effect of a parts program with a certain real-time kernel on the machining process of a workpiece could be tested initially by machining a workpiece, to then check the achieved machining accuracy and, if necessary, to correct the application program. However, this approach is obviously time-consuming, requires a substantial quantity of material, and is also expensive.

Simulation methods for machining a workpiece with a machine tool may include a computer provided with an application program to describe the machining to be performed by the machine tool in form of instruction steps. The computer executes the application program and determines, based on a simulation program for a controller of the machine tool, step-by-step machine-dependent control commands for the machine tool. The computer further determines, based on a computer-internal model of the machine tool and based on the determined machine-dependent control commands, expected actual states of the machine tool, thereby simulating execution of the machine-dependent control commands by the machine tool, Such simulation methods are disclosed, for example, in the technical article "CAD/CAM und CIM in der Metallbearbeitung" (CAD/CAM and CIM in metal processing) by Stefan Peiker and Norbert Schrufer, published in "tz für Metallbearbeitung", Vol. 82, No. 6/88, pages 17 to 27, or from German patent publication DE-A-100 47 928.

German patent publication DE-A-102 26 198 discloses a simulation method for a process of a processing machine, which is controlled by a stored-memory controller. In this simulation method, an application program is provided to a computer, with the application program describing the machining to be performed in the processing machine in form of instruction steps. The computer processes the application program and determines step-by-step control commands for the processing machine, based on a simulation program for a controller of the processing machine. The computer also determines, based on a computer-internal model of the processing machine and the afore-determined control commands, expected actual states of the processing machine, thereby simulating execution of the control commands by the processing machine. A similar process is also disclosed in WO-A-01/67193.

Japanese Patent Abstract to JP-A-07/084620 describes a simulation method for processing a workpiece with a machine tool, wherein an application program is provided to a computer, which describes in form of instruction steps the machining to be performed by the machine tool. By executing the application program, the computer step-by-step determines, based on a simulation program for a controller of the machine tool, machine-dependent control commands for the machine tool. A similar process is also disclosed in German patent publication DE-A-101 14 811.

The afore-described simulation programs are stand-alone programs used to simulate the actions of the machine tool. These simulation programs emulate the control software, but only partly and not in real-time. The expected actual states of the machine tool as determined by the simulation programs deviate more or less from the "true" actual states that the machine tool actually assumes when executing the application program. The information obtained with these simulation programs has therefore only limited significance.

In addition, generating the simulation programs and adapting the simulation programs to the new functionalities of the control software represent a significant programming task. Commercial versions of the simulation programs may hence be shipped much later than new control software, or not at all.

It would therefore be desirable and advantageous to provide an improved simulation method for processing a workpiece by a machine tool, which obviates prior art shortcomings and makes simulation programs that faithfully reproduce the behavior of the real-time kernel immediately available.

SUMMARY OF THE INVENTION

According to one aspect of the present invention, a method for simulating processing of a workpiece with a machine tool includes the steps of providing to a controller control software and an application program having control commands that control processing of the workpiece with the machine tool, and providing to a computer, that is separate from the controller and includes a computer-internal model of the machine tool, a simulation program with control software executable on the controller. The controller transmits. the application program to the computer, which executes the application program and step-by-step determines based on the simulation program machine-dependent control commands executable by the controller. The machine-dependent control commands depend on a virtual time base that is independent of an actual time base. The computer determines, based on a computer-internal model of the machine tool and the determined machine-dependent control commands, expected actual states of the machine tool, thereby simulating execution of the machine-dependent control commands in the machine tool.

According to another feature of the invention, a data carrier may have a computer program stored on the data carrier for simulating processing of a workpiece with a machine tool, with the processing being performed according to the method described above.

According to yet another feature of the invention, a computer for simulating processing of a workpiece with a machine tool is provided. The machine tool includes a controller with control software and an application program having control commands that control processing of the workpiece with the machine tool. The computer includes a mass storage device having stored therein a computer program that causes the computer to perform the afore-described method. The computer can be different from the controller that controls the machine tool.

The present invention resolves prior art problems by using the control software in the controller itself as a simulation program, with the time base being adapted accordingly so that computations need no longer be performed in real-time. In other words, the control software operates as if it were executed in real-time, although this may actually not be the case. The time base can be arbitrarily selected commensurate with the computing power of the computer. In particular, the time base can be incremented either faster or more slowly than the actual time. It can also be stopped and/or interrupted as needed.

In practical applications, the behavior of the machine tool is affected not only by the application program and the real-time kernel, but also the electrical and mechanical parameters of the machine tool itself. Examples of such parameters are the dynamic response of the drives and the particulars of the mechanical characteristic of the machine tool. Advantageously, the simulation method can operate more accurately if machine parameters are provided to the computer and the computer adapts the computer-internal model of the machine tool to the provided machine parameters.

According to another feature of the invention, the controller, when providing the application program to the computer, can also transmit a selection command for selecting a control program from the control software that was provided to the computer. The computer uses the control program defined by the selection command as the simulation program, which makes the simulation method more flexible. Alternatively, the control software can be provided to the computer together with the application program, for example, via a computer-to-computer link, such as a local area network (LAN), the Internet, and a point-to-point connection (dial-up connection).

According to yet another feature of the invention, the computer may determine a result, for example in the form of a dataset, of a machining operation from the totality of determined expected actual state values and outputs the result. With this approach, a user of the simulation method can quite easily evaluate the results obtained with the simulation method.

Alternatively or in addition, the computer can determine expected actual states, for example, in form of curves, of actuators of the machine tool based on the determined expected actual states, and output the expected actual states or curves.

According to yet another feature of the invention, the computer can check for a collision between the actuators of the machine tool based on the determined expected actual states and output a warning message if a likely collision is detected. In this way, dangerous states can be detected early.

According to yet another feature of the invention, the computer can check the application program for formal errors and, if a formal error is detected, can output an error message indicating a location or a type, or both, of the formal error in the application program. With this approach, the application program can be generated, checked and tested without actually machining a test workpiece on the machine tool.

Advantageously, the accuracy of the simulation can be improved further, if the computer takes into consideration previously determined expected actual states when determining new machine-dependent control commands for the machine tool and/or when determining new expected actual states of the machine tool.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
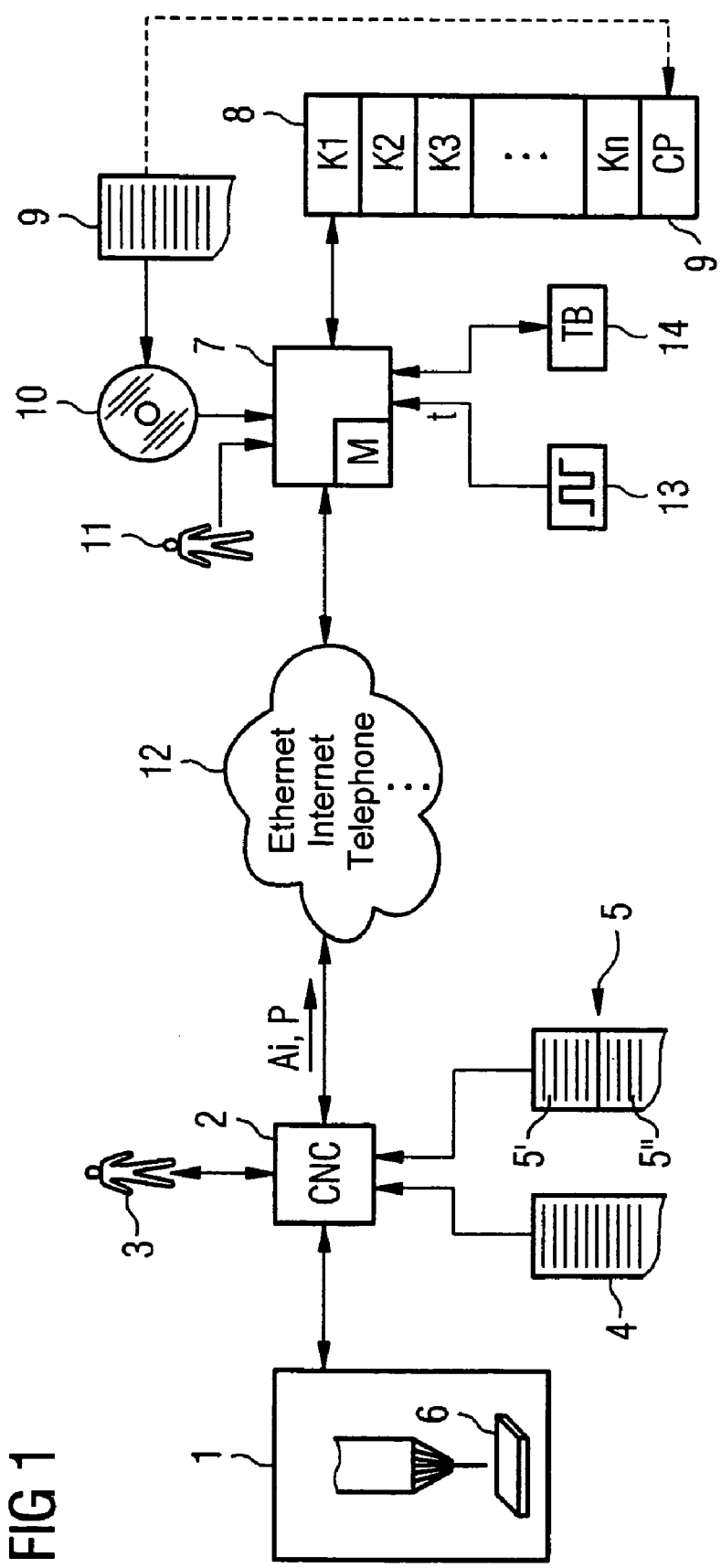
FIG. 1 shows schematically a machine tool with a controller connected via a computer-to-computer link to a computing device.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown schematically a machine tool 1 that is controlled by a numeric controller 2 (CNC 2). The numeric controller 2 receives an application program 4, for example, from a user 3 or from a main computer (not shown). The application program 4 includes instruction steps that describe machining operations to be performed by the machine tool 1. The instruction steps can be either machine-dependent or machine-independent.

The numeric controller 2 executes the application program 4. When executing the application program 4, the numeric controller 2 determines step-by-step machine-dependent control commands for the machine tool 1 and controls the machine tool 1 accordingly. This takes place within a real-time kernel 5, which includes a real-time operating system 5' and control software 5". The real-time kernel 5 is already stored in the numeric controller 2 by a manufacturer of the numeric controller 2. When the numeric controller 2 executes the application program 4, the machine tool 1 processes, for example, a workpiece 6.

A computer 7 is provided to simulate processing of the workpiece 6 by the machine tool 1. As shown in FIG. 1, the computer 7 is a separate unit from the numeric controller 2 and does not control the machine tool 1.

As shown in FIG. 1, the computer 7 also includes a mass storage device 8, for example a hard drive 8. A computer program 9 is stored on the mass storage device 8. The computer program 9 can be supplied to the computer 7, for example, by a data carrier 10, as indicated in FIG. 1 by a dashed line, whereby the data carrier stores the computer program 9 in (exclusively) machine-readable form. One example of such data carrier 10 is a CD-ROM. The computer program 9 can also be supplied to the computer 7 in a different form, for example via a local area network (LAN) or the Internet.

The computer program 9 can be called by a call command entered in the computer 7. The call command can be entered into the computer 7, for example, directly by a user 11. Alternatively, the call command can also be provided to the computer 7, for example, from the numeric controller 2 or from another computer (not shown) via a computer-to-computer link 12. The computer-to-computer link 12 can be implemented in any form, for example as Ethernet, Internet or as a telephone connection. Other forms are also possible.

When the computer program 9 is called, the computer 7 executes a simulation process that simulates machining the workpiece 6 with the machine tool 1. This process will be described hereinafter with reference to FIGS. 2A and 2B.

Figure 2A:
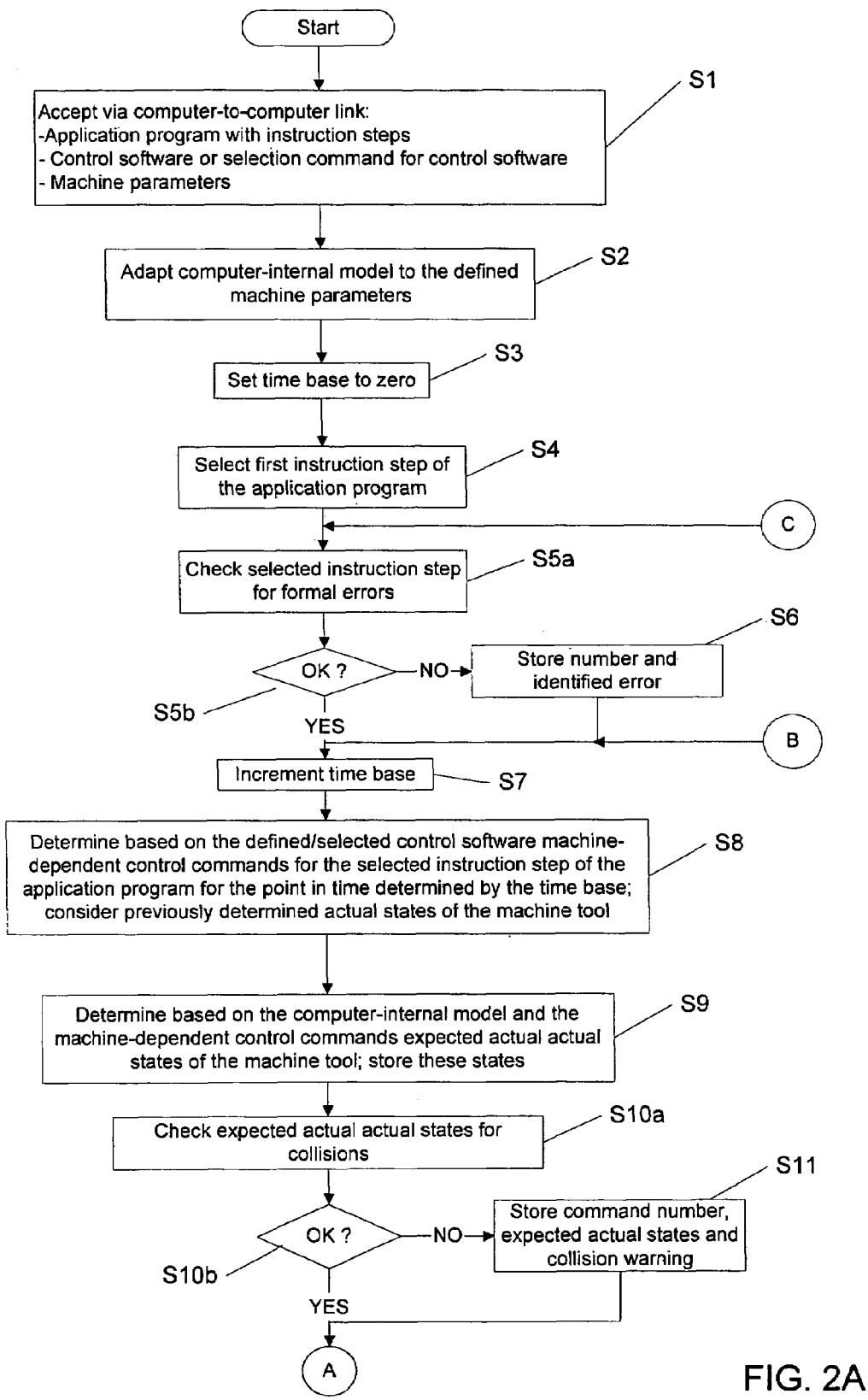
FIGS. 2A and 2B show each a process flow diagram of the simulation method according to the invention.

According to FIG. 2A, the computer 7 receives in step S1 several input parameters via the computer-to-computer link 12. In step S1, the computer 7 first receives the numeric controller 2 the application program 4 via the computer-to-computer link 12. The application program 4 can also be provided from a main computer or from a PC. The computer 7 also receives in step S1 a selection command Ai, by which the computer 7 can select a specific control software program from several control software programs K1 . . . Kn stored in mass storage device 8. These control software programs K1 . . . Kn are known to and accessible by the computer 7 and are preferably part of the computer program 9. Each of the control software programs K1 . . . Kn has a one-to-one correspondence with a corresponding control software program that can be executed on the machine tool 1. One of the control software programs K1 . . . Kn, for example the control software program K3, can correspond to the control software program 5" residing in the real-time kernel. Alternatively, in step S1, the control software program 5" of the numeric controller 2 could also be loaded directly into the computer 7.

Finally, in step S1, machine parameters P, such as for example the dynamic characteristic of drives of the machine tool 1, are provided to the computer 7. The machine parameters P can be stored, for example, in the numeric controller 2 in advance. However, the machine parameters P can also be manually entered by the operator 3 or the user 11. Alternatively, the machine parameters P can also be defined in a main computer.

In step S2, the computer 7 then adapts a computer-internal model M of the machine tool 1 to the preset machine parameters P. The model M is now ready to simulate the machine tool 1. The model M is likewise preferably part of the computer program 9.

Optionally, more than one model M can be implemented in the computer 7. In this case, alternatively or in addition to adapting the model M, the model can be selected by a selection command supplied to the computer 7, for example, via the computer-to-computer link 12.

The computer 7 includes a timing circuit 13 (or a clock 13). The timing circuit 13 operates in real-time. In other words, it runs continuously, with its content corresponding as accurately as possible to the actual time t. For example, the contents of the timing circuit 13 can be updated continuously based on the operating clock cycle of the computer 7.

The computer 7 further includes an additional time base 14. The time base 14 can be a memory location or a register whose contents can be arbitrarily changed by the computer 7. The contents of the memory location 14 or the register 14 is therefore independent of the actual time t defined by the timing circuit 13. However, when simulating the execution of the application program 4, the control software 5", K1 . . . Kn which is used to determine the machine-dependent control commands, interprets the contents of the time base 14 as actual time. As a result, the simulation program 5", K1 . . . Kn determines the machine-dependent control commands as a function of a virtual time base 14 that is independent of the actual time t. In step S3, the time base 14 is initially set to zero.

In step S4, the computer selects the first application step in the application program 4. This application step checks in step S5 for formal errors. For clarity, step S5 in FIG. 2A has been divided into two partial steps S5a and S5b.

If the check in step S5 does not indicate an error, then step S7 is executed immediately. Conversely, if an error has been detected, step S6 is executed before step S7. Step S6 stores the number of the instruction step and the identified error and can be used at a later time to send an error message, based on which the location of the error in the application program 4 (i.e., the number) and the type of the error (i.e., the identified error) can be identified.

In step S7, the time base 14 is incremented. In step S8, the computer 7 determines at the point in time determined in the time base 14 from the control software 5", K1 . . . Kn machine-dependent control commands for the selected instruction step of the application program 4.

As described in more detail below, step S8 is part of a loop that is executed several times when the computer 7 sequentially executes the instruction steps of the application program 4. The process is also sequentially executed within the individual instruction steps. The computer can thereby take into account any already determined expected actual states of the machine tool 1 when determining the machine-dependent control commands. For example, a control command can depend on a previously determined expected speed of an actuator of the machine tool 1.

In step S9, the computer 7 determines, based on the computer-internal model M and the previously determined machine-dependent control commands, new expected actual states of the machine tool 1 and stores these newly determined expected actual states. It will be understood that the already determined expected actual states can be taken into consideration when determining the new expected actual states. The computer 7 thus simulates the execution of the machine-dependent control commands in the machine tool 1 by determining the expected actual states of the machine tool.

In step S10, the computer 7 checks the determined expected actual states for any risk of a collision. In other words, the computer 7 checks based on the determined expected actual states if a collision between movable elements of the machine tool 1 is possible when the machine tool 1 actually executes the control commands. If a collision is not expected, then step S12 is immediately executed.

Otherwise, in step S11, the number of the instruction step, the expected actual states and a collision morning are stored.

Figure 2B:
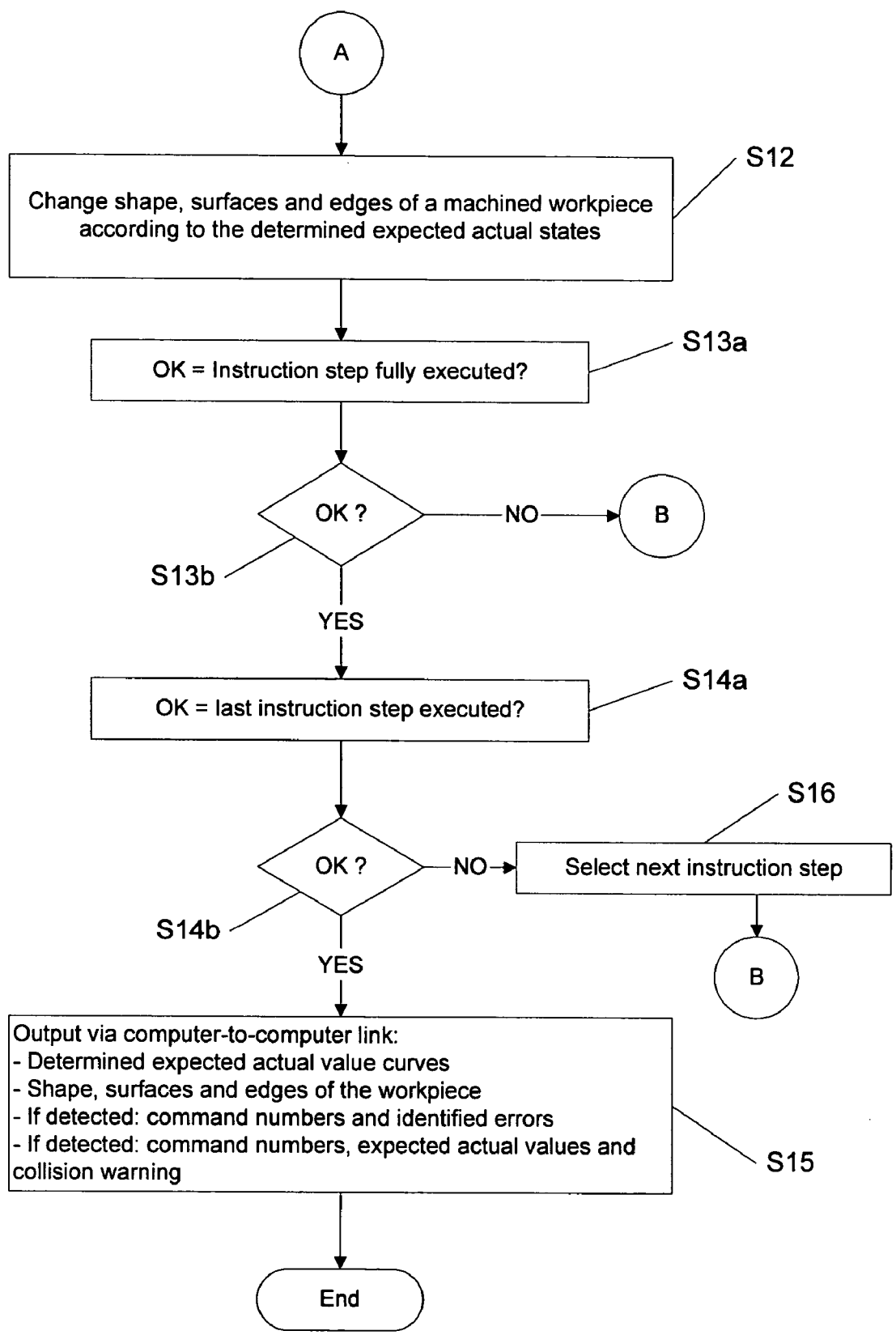

In step S12, the computer 7 updates, as shown in FIG. 2B, based on the determined expected actual states of the machine tool 1, a dataset that describes the shape, surfaces and edges of the workpiece 6, as if the workpiece 6 were actually machined by the machine tool 1. Accordingly, the computer 7 determines step-by-step (and based on the totality of the determined actual states of the machine tool 1) a result of the machining process.

In step S13, which for clarity is also divided into partial steps S13a and S13b, the computer 7 checks if a currently simulated instruction step has been completed. If the instruction step has not yet been completed, then the process returns to step S7. Otherwise, step S14 is executed.

The computer 7 checks in step S14, if the just completed instruction step is the last instruction step of the application program 4. For sake of clarity, step S14 is also divided into partial steps S14a and S14b. If the processed instruction step was the last instruction step of the application program 4, then the process continues with step S15. Otherwise, the next instruction step of the application program 4 is selected in step S16, and the process returns to step S5.

In step S15, the computer 7 outputs to the user of the computer program 9 several messages via the computer-to-computer link 12. In the exemplary embodiment, the messages are transmitted to the numeric controller 2 via the computer-to-computer link 12, which can provide the messages, for example, to the user 3. However, other data paths, for example to a main computer or a PC, are also feasible.

The computer 7 initially outputs curves of the determined actual values, as well as the dataset, the shape, surfaces and edges of the expected workpiece 6. The computer 7 can also output the number of the program step and the errors identified during the check in step S5. Moreover, the computer 7 can also output the number of the program step, corresponding expected actual values and collision warnings determined during the execution of step S10.

Accordingly, the actions of the machine tool 1 can be realistically simulated with the simulation method of the invention. With the present invention, the control software 5", K1 . . . Kn is advantageously used for the simulation of the machining process instead of an emulator for the control software 5", K1 . . . Kn. This eliminates for fundamental reasons any potential differences between the simulated actions of the machine tool 1 and the actual actions of the machine tool 1. In addition, there is no need to separately develop an emulator, because the simulation program simultaneously also supplies the control software 5", K1 . . . Kn. Moreover, with the computer-to-computer link 12, the computer 7 can be located at an entirely different location than the numeric controller 2 and/or a main computer (not shown) for the numeric controller 2. The computer-to-computer link 12 also makes it unnecessary to transport to data on a physical data carrier (CD-ROM, etc.).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for simulating processing of a workpiece with a machine tool, comprising the steps of:
   providing to a controller control software and an application program having control commands that control processing of the workpiece with the machine tool;
   providing to a computer, that is separate from the controller and comprises a computer-internal model of the machine tool, a simulation program comprising the control software executable on the controller;
   the controller transmitting the application program to the computer;
   the computer executing the application program and step-by-step determining based on the simulation program machine-dependent control commands executable by the controller, said machine-dependent control commands depending on a virtual time base that is independent of an actual time base, and
   the computer determining, based on a computer-internal model of the machine tool and the determined machine-dependent control commands, expected actual states of the machine tool, thereby simulating execution of the machine-dependent control commands in the machine tool.

2. The simulation method of claim 1, wherein machine parameters are provided to the computer, with the computer adapting the computer-internal model of the machine tool to the provided machine parameters.

3. The simulation method of claim 1, wherein the controller, when providing the application program to the computer, also transmits a selection command for selecting a control program from the control software previously provided to the computer, with the computer using the control program defined by the selection command as the simulation program.

4. The simulation method of claim 1, wherein the control software is provided to the computer together with the application program.

5. The simulation method of claim 2, wherein the machine parameters are provided to the computer via a computer-to-computer link.

6. The simulation method of claim 5, wherein the computer-to-computer link includes a link selected from the group consisting of a local area network (LAN), the Internet, and a point-to-point connection.

7. The simulation method of claim 1, wherein the computer determines a result of a machining operation from a totality of the determined expected actual states, and outputs the result.

8. The simulation method of claim 7, wherein the result includes a dataset describing a machined workpiece.

9. The simulation method of claim 1, wherein the computer determines an expected actual actuator state of the machine tool based on the expected actual states, and outputs the actuator state.

10. The simulation method of claim 9, wherein the computer checks for a collision between actuators of the machine tool based on the determined expected actual actuator state and outputs a warning message if a likely collision is detected.

11. The simulation method of claim 1, wherein the computer checks the application program for formal errors and, if a formal error is detected, outputs an error message indicating a location or a type, or both, of the formal error in the application program.

12. The simulation method of claim 7, wherein the computer outputs the result via a computer-to-computer link.

13. The simulation method of claim 12, wherein the computer-to-computer link includes a link selected from the group consisting of a local area network (LAN), the Internet, and a point-to-point connection.

14. The simulation method of claim 1, wherein the computer takes into account previously determined expected actual states when determining new machine-dependent control commands for the machine tool or when determining new expected actual states of the machine tool, or both.

15. A data carrier with a computer program stored on the data carrier for simulating processing of a workpiece with a machine tool, the processing comprising the steps of:
- providing to a controller control software and an application program having control commands that control processing of the workpiece with the machine tool;
- providing to a computer, that is separate from the controller and comprises a computer-internal model of the machine tool, a simulation program comprising the control software executable on the controller;
- the controller transmitting the application program to the computer;
- the computer executing the application program and step-by-step determining based on the simulation program machine-dependent control commands executable by the controller, said machine-dependent control commands depending on a virtual time base that is independent of an actual time base, and the computer determining, based on a computer-internal model of the machine tool and the determined machine-dependent control commands, expected actual states of the machine tool, thereby simulating execution of the machine-dependent control commands in the machine tool.

16. A computer for simulating processing of a workpiece with a machine tool,
- the machine tool including a controller with control software and an application program having control commands that control processing of the workpiece with the machine tool, the computer including a mass storage device having stored therein a computer program, said computer program providing to the computer, that is separate from the controller and comprises a computer-internal model of the machine tool, a simulation program comprising the control software executable on the controller;
- causing the controller to transmit the application program to the computer;
- causing the computer to execute the application program and to step-by-step determine, based on the simulation program, machine-dependent control commands executable by the controller, said machine-dependent control commands depending on a virtual time base that is independent of an actual time base, and
- causing the computer to determine, based on a computer-internal model of the machine tool and the determined machine-dependent control commands, expected actual states of the machine tool, thereby simulating execution of the machine-dependent control commands in the machine tool.

17. The computer of claim 16, wherein the computer is different from the controller that controls the machine tool.

* * * * *